US010096442B2

United States Patent
Ishigure et al.

(10) Patent No.: US 10,096,442 B2
(45) Date of Patent: Oct. 9, 2018

(54) COMBINATION SWITCH LEVER

(71) Applicant: KABUSHIKI KAISHA TOKAI RIKA DENKI SEISAKUSHO, Aichi (JP)

(72) Inventors: Nobuyuki Ishigure, Aichi (JP); Yoshio Chiba, Aichi (JP); Akio Nishiyama, Aichi (JP); Yohei Hotta, Aichi (JP); Yasuaki Nadaya, Aichi-ken (JP); Toshihiko Kosugi, Aichi-ken (JP)

(73) Assignee: KABUSHIKI KAISHA TOKAI RIKA DENKI SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/403,833

(22) Filed: Jan. 11, 2017

(65) Prior Publication Data

US 2017/0200573 A1    Jul. 13, 2017

(30) Foreign Application Priority Data

Jan. 13, 2016  (JP) .................................. 2016-004768

(51) Int. Cl.
*H01H 13/14*  (2006.01)
*H01H 21/22*  (2006.01)
*B60Q 1/14*  (2006.01)

(52) U.S. Cl.
CPC ............ *H01H 21/22* (2013.01); *B60Q 1/1469* (2013.01); *H01H 13/14* (2013.01); *H01H 2231/026* (2013.01)

(58) Field of Classification Search
CPC ............. H01H 2231/026; H01H 13/14; H01H 13/702; H01H 19/585; H01H 25/04; H01H 19/08; H01H 19/10; H01H 19/14; H01H 19/63; H01H 2235/01; H01H 3/42;
(Continued)

(56) References Cited

U.S. PATENT DOCUMENTS 5,967,300 A    10/1999  Hecht et al.

FOREIGN PATENT DOCUMENTS

| CN | 1200193 A | 11/1998 |
| JP | 11-312440 A | 11/1999 |

OTHER PUBLICATIONS

European Search Report Application No. 17151424.3-1762/3196073 dated Oct. 18, 2017.
(Continued)

*Primary Examiner* — Ahmed Saeed
(74) *Attorney, Agent, or Firm* — Roberts Mlotkowski Safran Cole & Calderon, P.C.

(57) ABSTRACT

A combination switch lever includes a cylinder body including an opening, a plurality of switches to operate an electric component disposed in the vehicle, a flexible board that is disposed inside the cylinder body and that includes a circuit part and a non-circuit part disposed outside the circuit part in a width direction, and a first guide member and a second guide member that are disposed inside the cylinder body so as to be opposite to each other sandwiching the flexible board. An inside projection is formed at a vicinity of the opening of the cylinder body on an opposite surface of the first guide member and/or the second guide member, and the inside projection presses the non-circuit part. The first guide member and the second guide member include an adjacent opposite surface such that an opposite distance therebetween is partially narrowed.

5 Claims, 5 Drawing Sheets

(58) Field of Classification Search
CPC .... H01H 3/50; H01H 19/6355; B60Q 1/1476; B60Q 1/1469; B60Q 1/0076; B60Q 1/1484
USPC ... 200/61.54, 292, 11 DA, 11 G, 16 A, 16 D
See application file for complete search history.

(56) References Cited

OTHER PUBLICATIONS

Office Action issued in the corresponding Chinese Application No. 201611234003.7 dated May 17, 2018.

B-B

P

ENLARGED CROSS SECTIONAL VIEW
CUT ALONG THE C-C LINE

ENLARGED CROSS SECTIONAL VIEW
CUT ALONG THE B-B LINE

COMBINATION SWITCH LEVER The present application is based on Japanese patent application No. 2016-004768 filed on Jan. 13, 2016, the entire contents of which are incorporated herein by reference.

BACKGROUND OF THE INVENTION

1. Field of the Invention

The invention relates to a combination switch lever (or composite switch lever).

2. Description of the Related Art

Conventionally, a combination switch having a board which integrates a flexible printed circuit board with a circuit board, which is disposed inside a cylinder body is known.

When the flexible board is disposed in the combination switch lever, since the flexible board flaps inside the lever caused by lever operation peculiar to a vehicle or vehicular vibration, the combination switch lever is rubbed with other parts, is disconnected, and generates abnormal noise. Thus, regulating a route by controlling the flexible board is needed so as to regulate flapping.

In an conventional configuration, whole face of the board which integrates the circuit board with the flexible board is fixed by abutted on a fixing member which is the other member disposed inside the cylinder body so as to regulate flapping the board. Hereby, flapping the flexible board and the circuit board caused by the vehicular vibration etc. is regulated (see e.g. JP-A-H11-312440).

SUMMARY OF THE INVENTION

If whole in the width direction of the circuit board is abutted on the other fixing member etc., it is liable to apply a mechanical load to a circuit part on the circuit board at the abutting portion.

It is an object of the present invention to provide a combination switch lever that can regulate flapping in the lever without the whole in the width direction of the flexible board abutted on the other fixing member etc.

According to an embodiment of the present invention, a combination switch lever for being connected to a supporter in a vehicle comprises:

a cylinder body comprising an opening at a supporting side in a longitudinal direction along which the combination switch lever extends;

a plurality of switches to operate an electric component disposed in the vehicle;

a flexible board that is disposed inside the cylinder body and extended along the longitudinal direction, and that comprises a circuit part that connects electrically the plurality of switches with an electric device disposed outside the combination switch lever and a non-circuit part disposed outside the circuit part in a width direction; and a first guide member and a second guide member that are disposed inside the cylinder body so as to be opposite to each other sandwiching the flexible board, wherein an inside projection projected toward a side of the flexible board is formed at a vicinity of the opening of the cylinder body on an opposite surface of the first guide member and/or the second guide member, and the inside projection presses the non-circuit part of the flexible board to regulate a shift of the flexible board, and wherein the first guide member and the second guide member comprise an adjacent opposite surface such that an opposite distance between the first guide member and the second guide member is partially narrowed at a part that is nearer to a tip end side than the vicinity of the opening of the cylinder body and that is opposite to the non-circuit part of the flexible board.

The two guide members are formed partially narrow at several positions so as to interfere with a non-circuit part which is not the circuit part of the flexible board. And the inside projection which is disposed in a portion corresponding to the vicinity of the opening of supporting side of the cylinder body presses the non-circuit part of the flexible board and holds the flexible board so as not to shift. By the structure, flapping the flexible board can be regulated without the other member in the whole of the width direction of the flexible board, especially the circuit part abutted.

According to an embodiment of the invention, a combination switch lever can be provided that can regulate flapping in the lever without the whole in the width direction of the flexible board abutted on the other fixing member etc.

BRIEF DESCRIPTION OF THE DRAWINGS

Next, the present invention will be explained in conjunction with appended drawings, wherein.

DETAILED DESCRIPTION OF THE PREFERRED EMBODIMENTS

Figure 1:
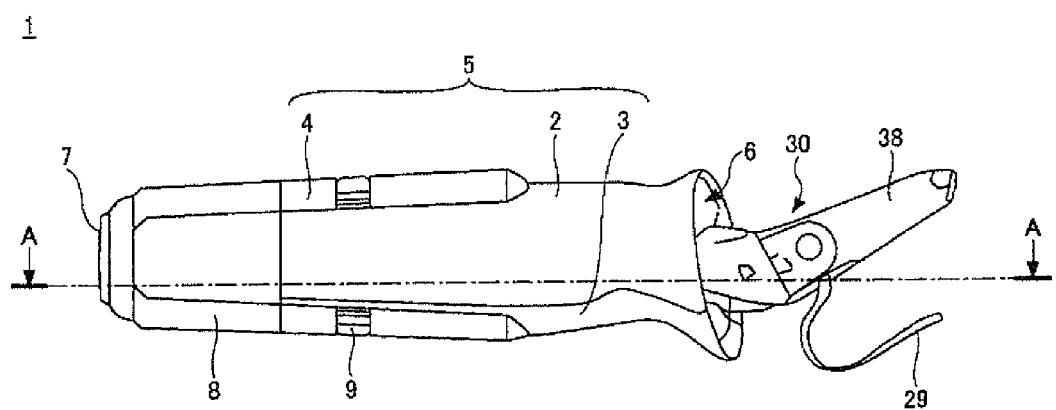
FIG. 1 is an illustration diagram showing a combination switch lever according to the embodiment in the present invention.

Next, an embodiment according to the invention will be described below with the reference to the appended drawings. Meanwhile, the same reference numerals are assigned to the elements in substantially commons in the description and figures, and the redundant description thereof is omitted.

FIG. 1 is an illustration diagram showing a combination switch lever according to the embodiment in the present invention. As shown in FIG. 1, the combination switch lever 1 is in a shape of a handle, and includes guide members 30, 40 in which include a flexible board 20 which is connected to a cable 29, and covers 2, 3 which cover the guide members 30, 40.

The combination switch lever 1 (which is also called as the lever) is disposed nearby a steering wheel etc. of a driver's seat of a vehicle. The guide member 30 (40) which includes the flexible board 20 is connected and supported by inserting or fitting an insertion part 38 into a body (a supporter) fixed in a steering column etc. in the vehicle, and established with the steering wheel. The combination switch lever 1 is used for operating a direction indicator, a light, or wipers etc.

Figure 2:
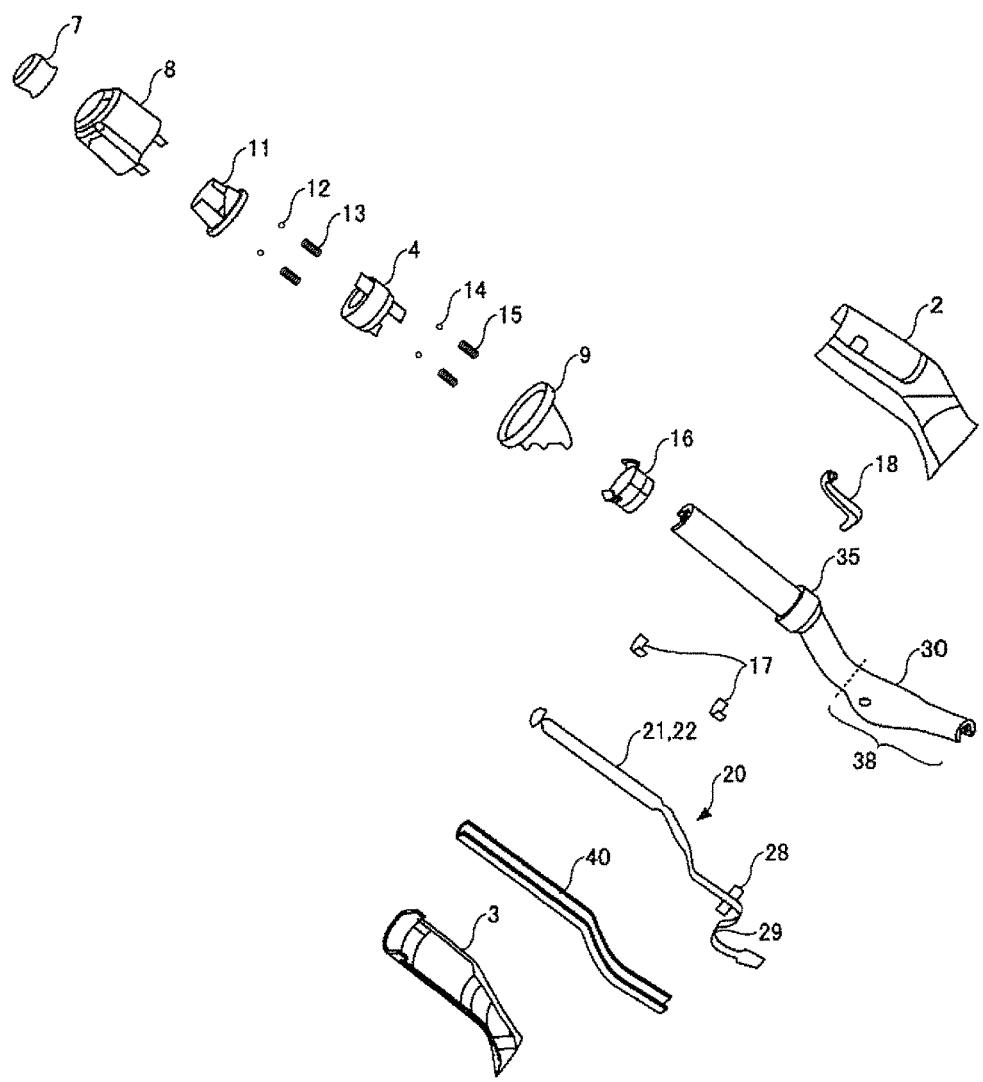
FIG. 2 is an exploded perspective view showing the combination switch lever shown in FIG. 1.

FIG. 2 is an exploded perspective view showing the combination switch lever 1 shown in FIG. 1. For the combination switch lever 1, a cylinder body 5 which is provided with a top cover 2, a bottom cover 3, and a holder 4 is releasable. The flexible board 20 is disposed in the center of the covers 2, 3.

In the description, the flexible board means a sheeted circuit such as FPC (Flexible Printed Circuit) and the cable such as FFC (Flexible Flat Cable).

A circuit part 21 (see e.g. FIG. 6) is integrally formed at a central part in the lateral direction nearly perpendicular to the longitudinal direction of the covers 2, 3 of the lever 1, which is a portion excepting a supporting side (supporter side) opening 6 (Exit) supported by the steering column etc. in the longitudinal direction which the lever 1 extends. Also, the cable 29 is connected to the flexible board 20, and connected electrically to an electric device disposed outside the combination switch lever 1 (for example, a driving part for the steering wheel). Thus, the flexible board 20 is in the form of wide-cut as a board connecting part 28 inside the insertion part 38 of the first guide member 30.

A first guide member 30 and a second guide member 40 are disposed so as to be opposite each other sandwiching the flexible board 20. The combination switch lever 1 can oscillate toward the two or more directions from the driving part etc. to which the flexible board 20 included in the guide members 30, 40 is connected by the driver's operation for the lever 1 (inclining the lever 1).

The lever 1 is provided with a push button 7 (a push switch) which is attached at a tip end part of the lever 1, a light knob 8, and a fog knob 9 as switches for the electric component such as a lamp, which are disposed in the vehicle. Also, a cylindrical light knob 8, a ring shape holder 4 and the fog knob 9 etc. are outer fit at an outer periphery of tip end side of the guide members 30, 40 (see e.g. FIG. 5) which form nearly cylindrical shape by facing each other.

The light knob 8 and the fog knob 9 are rotary operation type rotary switches which can rotate in the circumferential direction of the cylinder body 5 of the lever 1. The light knob 8 switches on/off a small lamp and a head lamp. The fog knob 9 switches on/off a fog lamp.

A detent cam 11 which is connected to the flexible board 20 described above and controls detent by detecting deformation of the flexible board 20 caused by oscillating operation of the lever 1 is disposed inside the light knob 8.

In an outer package, a short cylindrical holder 4 which is a part of the cylinder body 5 is disposed between the light knob 8 and the fog knob 9.

One pair of a pole 12 and a spring 13 for connecting the detent cam 11 with the holder 4 is disposed inside the light knob 8. Also, one pair of a pole 14 and a spring 15 for connecting the holder 4 with the fog knob 9 is disposed inside the holder 4.

The fog knob 9 is connected to the top cover 2, and the bottom cover 3, and connected to the first guide member 30 through the fog cam 16. Thus, the fog cam 16 abuts an outer projection 35 of the first guide member 30 in the assembled state.

Meanwhile, kind of the switch shown in FIG. 2 is an example. A plurality of switches disposed in the combination switch according to the present invention may be used for the other uses (for example, wipers, washer fluid, or rotational gear). Otherwise, if the switch is used for the same use, combination of the kind (the push button, kind of rotational knob, a position) and use of the switches may be changed.

Figure 3:
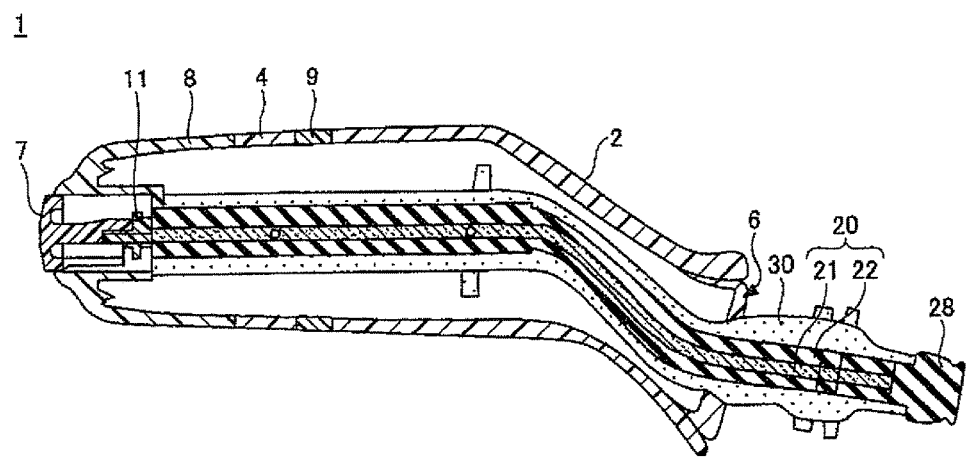
FIG. 3 is a cross sectional view showing the combination switch lever along a line A-A in FIG. 1.
Figure 4:
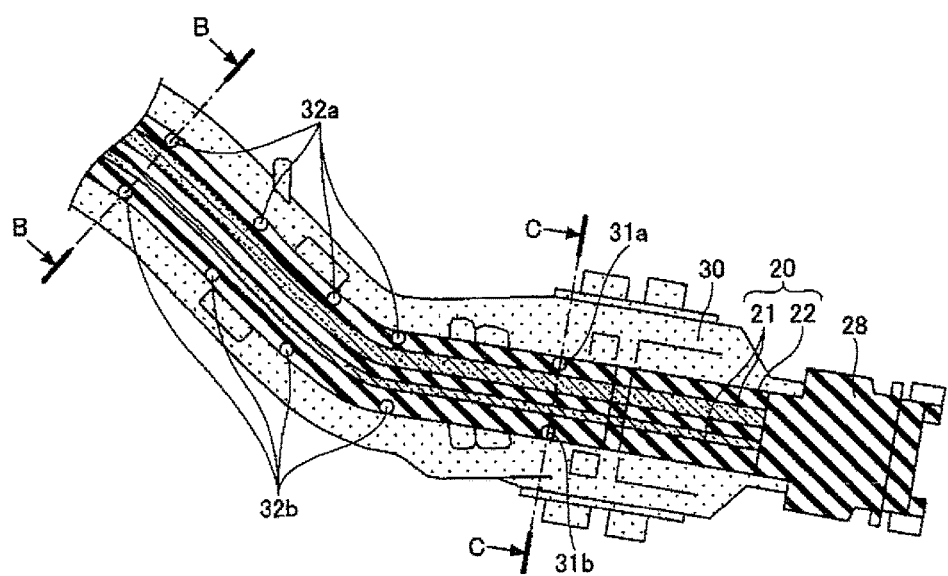
FIG. 4 is an enlarged view of FIG. 3.

FIG. 3 is a cross sectional view showing the combination switch lever along a line A-A in FIG. 1. FIG. 4 is an enlarged view of FIG. 3. Furthermore, in FIGS. 3 and 4, the insertion part 38 of the first guide member 30 shown in FIG. 1 is omitted.

As shown in FIGS. 3 and 4, inside projections 31a, 31b which are projected from a portion in which is opposite to a non-circuit part 22 of the flexible board 20 are disposed on the inner surface of the first guide member 30 which sandwiches the flexible board 20 nearby the opening 6 of the covers 2, 3 of the lever 1, and contact surfaces 32a, 32b are disposed in the portion excepting the vicinity of the opening 6.

Figure 5:
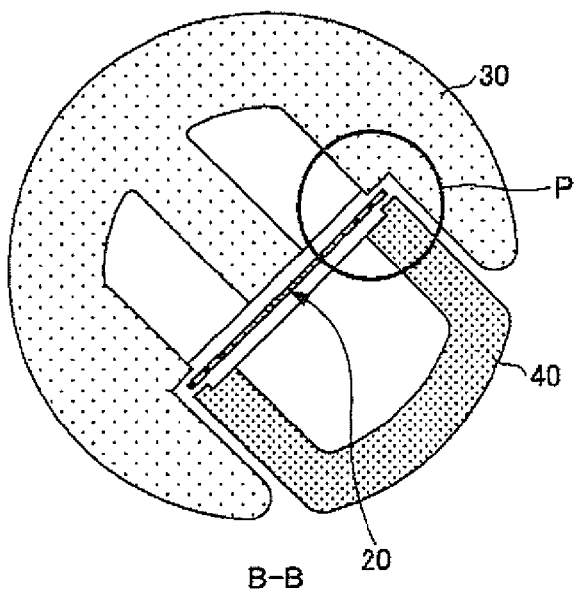
FIG. 5 is a cross sectional view showing the combination switch lever along a line B-B in FIG. 4.
Figure 6:
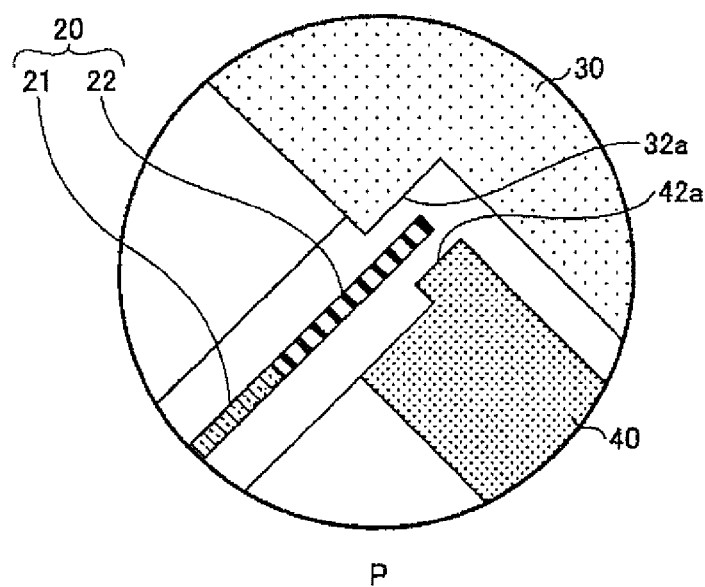
FIG. 6 is an enlarged view of FIG. 5.

FIG. 5 is a cross sectional view showing the combination switch lever 1 along a line B-B in FIG. 4. FIG. 6 is an enlarged view of an end in the lateral direction of the flexible board 20 at a P portion shown in FIG. 5.

As shown in FIG. 5, when the first guide member 30 whose cross section is roundly E-shaped and the second guide member 40 whose cross section is roundly U-shaped are disposed between the covers 2, 3, an outward shape of the cross section is circular shape. As shown in FIG. 5, the flexible board 20 is sandwiched at the nearly central part where the first guide member 30 is opposite to the second guide member 40.

According to the enlarged view of FIG. 6, the flexible board 20 is provided with the circuit part 21 and the non-circuit part 22 disposed outside the circuit part 21 in the lateral direction (the width direction). The circuit part 21 (a circuit board) is connected electrically to the plurality of switches (such as the push button 7, the light knob 8, the fog knob 9). The non-circuit part 22 is integrally formed with the circuit part 21.

As shown in FIG. 6, the first guide member 30 and the second guide member 40 dispose adjacent opposite surfaces (contact surfaces) 32a, 42a respectively so as to sandwich the non-circuit part 22, while the first guide member 30 and the second guide member 40 are apart from, which is the both end parts in the lateral direction of the flexible board 20 and in which the circuit part 21 is not formed.

Figure 7:
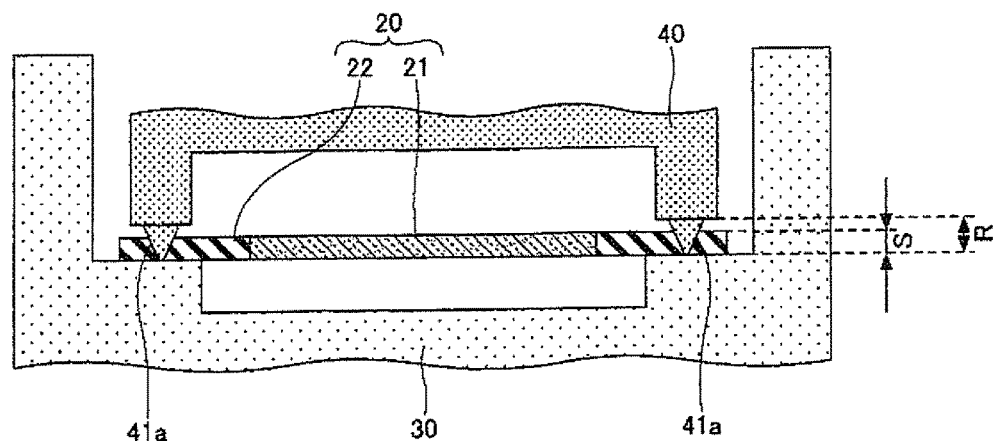
FIG. 7 is an illustration diagram showing the function of an inside projection shown in a cross section along a line C-C in FIG. 4.

FIG. 7 is an enlarged cross sectional view in the lateral direction showing the flexible board 20 nearby the opening 6 of the covers 2, 3 of the lever 1 (cross section shown in FIG. 4 along a line C-C). As shown in FIG. 7, in the vicinity of the opening 6 of the covers 2, 3, inside projections (crush ribs) 41a, 41b projected from the second guide number 40 are disposed in a non-circuit part 22 side both end parts in the lateral direction of the flexible board 20 which excepts the circuit part 21 of the flexible board 20.

Although FIG. 4 shows an example that the inside projection is disposed in the first guide member 30, and FIG. 7 shows an example that the inside projection is disposed in the second guide member 40, the inside projection may be disposed in either guide member 30, 40. Otherwise, one pair of the inside projections which are disposed in both ends in the lateral direction may be respectively disposed in the guide members 30, 40.

The non-circuit part 22 which is the end part in the lateral direction of the flexible board 20 is pressed (crushed) by the inside projections 41a, 41b projected toward inside and fixed.

In FIG. 7, heights R of the inside projections (Rib) 41a, 41b are set so as to be higher than the height S of the non-circuit part 22 of the flexible board 20. In this case, height dimension is set so as to apply a load enough to fix the flexible board 20 even if the inside projections 41a, 41b approach most closely by tolerance when the flexible board 20 begins to shift by applied reaction force in the lever operation as effects of the inside projections 41a, 41b.

Thus, in the guide member 40, by disposing the inside projections 41a, 41b in the position nearby the opening 6 of the covers 2, 3 of the lever 1, that is, the position where the circuit part 21 is excepted (non-circuit part 22) from the flexible board 20 in the supporter side to which the lever 1 is connected (supported by), flapping (shift) the flexible board 20, is regulated and fixed.

By the inside projections 31a, 31b, 41a, 41b described above pressing the non-circuit part 22, the flexible board 20 integrally formed by the circuit part 21 and the non-circuit part 22 is fixed with the first guide member 30 and the second guide member 40. Thus, a shift of the flexible board 20 including the circuit part 21 from the cylinder body 5 (the covers 2, 3) can be regulated without the whole in the width direction of the flexible board 20 on the other member abutted.

Also, since the inside projections 41a, 41b of the guide member 40 contact the non-circuit part 22 of the flexible board 20, the circuit part 21 fails to contact the guide members 30, 40, and the circuit part 21 (the circuit board) can avoid being applied the physical load.

Figure 8:
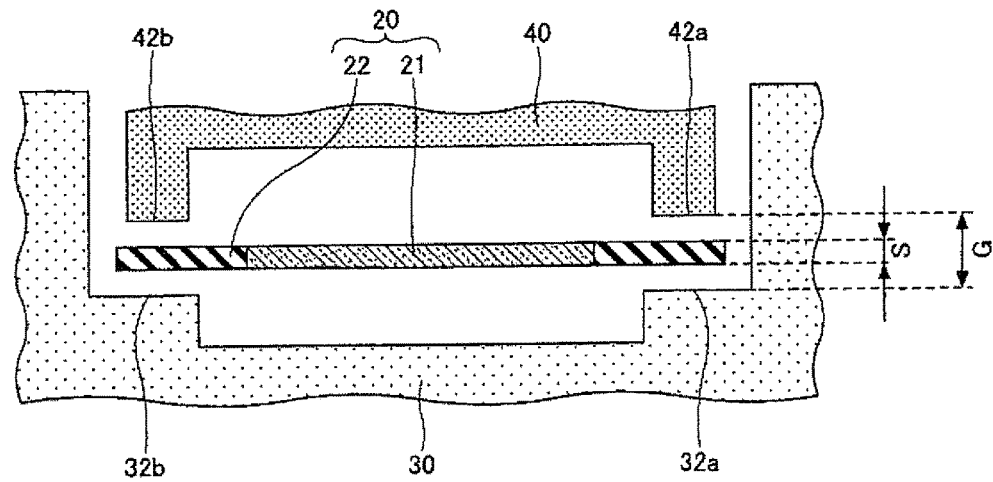
FIG. 8 is an illustration diagram showing the function of an adjacent opposite surface shown in a cross section along a line B-B in FIG. 4.

FIG. 8 is an enlarged cross sectional view in the lateral direction showing the vicinity of the flexible board 20 which is apart from the opining 6 of the covers 2, 3 of the lever 1 (the cross section in FIG. 4 along a line B-B).

As shown in FIG. 8, the adjacent opposite surfaces (32a, 42a), (32b, 42b) which are contiguously opposite to the non-circuit parts 22 disposed in the both end parts in the lateral direction of the circuit part 21 of the flexible board 20 are disposed respectively in a tip end side part apart from the opening 6 of the covers 2, 3.

In the adjacent opposite surfaces (32a, 42a), (32b, 42b), an opposing distance between the first guide member 30 and the second guide member 40 which sandwich the flexible board 20 is narrow. That is, the distance between the first guide member 30 or the second guide member 40, and the flexible board 20 is narrow. Thus, the width of the flap which shifts caused by contacting the non-circuit part 22 of the flexible board 20 with any one of the adjacent opposite surfaces (32a, 42a), (32b, 42b) by the vehicular vibration etc. can be regulated.

In FIG. 8, a space G between the adjacent opposite surfaces (32a, 42a), (32b, 42b) is set wider than the height S of the non-circuit part 22 of the flexible board 20 with a margin. Thus, the distance between the adjacent opposite surfaces (32a, 42a), (32b, 42b) and the end part of the flexible board is set so as to be not less than 0 if the tolerance is minimum caused by the effect of the adjacent opposite surface (the contact surface), and, in the tip end side of the cover further than the opening, the two guide members sandwich the flexible board with a predetermined margin.

When the two guide members sandwich and hold the flexible board as described above, in the tip end side of the cover apart from the opening, a plurality of adjacent opposite surfaces which are as the contact surfaces are disposed in a plurality of positions at both sides such that the outside non-circuit part which is not the circuit part interferes with the guide member and the inside projection presses (fixes) the flexible board nearby the opening of the cover such that the flexible board fails to shift. By the structure, the shift of the flexible board can be regulated nearby the opening increasing the precision certainly by the guide members sandwiching the non-circuit part of the flexible board at the tip end side part of the cover apart from the opening with a margin and pressing nearby the opening.

Regulating route of the flexible board disposed in the combination lever by the above way, abnormal noise caused by the interference between the flexible board and the other parts or disconnection at the circuit part of the flexible board can be prevented if the flexible board shifts caused by the shift of the lever peculiar to the vehicle or the vehicular vibration.

Moreover, pressing the non-circuit part 22 which is the flexible board 2 excepting the circuit part 21 nearby the opening 6 of the supporting side of the covers 2, 3 of the lever 1 using the inside projections 31a to 41a, entering dust etc. into the guide member of the lever can be regulated. Also, in the tip end side part of the covers 2, 3 apart from the opening 6, even if the dust etc. enters into the lever caused by the lever operation or the vehicular vibration, shaving the circuit part and disconnecting can be solved by (the plurality of) the adjacent opposite surfaces of which the opposing distance for the non-circuit part 22 of the flexible board 20 are partially in the lateral direction narrowed by opposite to the non-circuit part 22 of the flexible board 20 with the predetermined margin (see e.g. FIG. 8).

Although, the embodiments of the invention about the combination switch lever configured by the combination of the switches so as to operate the electric component disposed in the vehicle have been described, the invention is not limited to the embodiments. The various kinds of modifications and improvement can be implemented within the present invention.

The invention claimed is:

1. A combination switch lever for being connected to a supporter in a vehicle, comprising:
   a cylinder body comprising an opening at a supporting side in a longitudinal direction along which the combination switch lever extends;
   a plurality of switches to operate an electric component disposed in the vehicle;
   a flexible board that is disposed inside the cylinder body and extended along the longitudinal direction, and that comprises a circuit part that connects electrically the plurality of switches with an electric device disposed outside the combination switch lever and a non-circuit part disposed outside the circuit part in a width direction; and
   a first guide member and a second guide member that are disposed inside the cylinder body so as to be opposite to each other sandwiching the flexible board,
   wherein an inside projection projected toward a side of the flexible board is formed at a vicinity of the opening of the cylinder body on an opposite surface of the first guide member and/or the second guide member, and the inside projection presses the non-circuit part of the flexible board to fix the flexible board, and
   wherein the first guide member and the second guide member comprise adjacent opposite surfaces between which an opposite distance between the first guide member and the second guide member is, partially in a lateral direction of the flexible board, narrowed with a margin at a part that is nearer to a tip end part of the switch lever opposite to the supporter than the vicinity of the opening of the cylinder body and that is opposite to the non-circuit part of the flexible board.

2. The combination switch lever according to claim 1, wherein a pair of ones of the inside projection are formed at both ends in a lateral direction of the flexible board.

3. The combination switch lever according to claim 1, wherein the inside projection has a height more than that of the non-circuit part.

4. The combination switch lever according to claim 1, wherein the adjacent opposite surfaces are intermittently formed at the tip end side.

5. The combination switch lever according to claim 1, wherein the margin between the adjacent opposite surfaces of the first guide member and the second guide member is always larger than the thickness of the non-circuit part of the flexible board.

\* \* \* \* \*